United States Patent
Reyne

(10) Patent No.: US 10,496,100 B1
(45) Date of Patent: Dec. 3, 2019

(54) ULTRAVIOLET PAINT-BASED VEHICLE GUIDANCE

(71) Applicant: Universal City Studios LLC, Universal City, CA (US)

(72) Inventor: Christopher Lee Reyne, Clermont, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 0 days.

(21) Appl. No.: 16/127,862

(22) Filed: Sep. 11, 2018

(51) Int. Cl.
*G05D 1/02* (2006.01)
*G05D 1/00* (2006.01)

(52) U.S. Cl.
CPC ......... *G05D 1/0234* (2013.01); *G05D 1/0088* (2013.01); *G05D 1/0297* (2013.01); *G05D 2201/02* (2013.01)

(58) Field of Classification Search
CPC .. G05D 1/0234; G05D 1/0088; G05D 1/0297; G05D 2201/02
See application file for complete search history.

(56) References Cited

U.S. PATENT DOCUMENTS

| | | | |
|---|---|---|---|
| 3,935,922 A | 2/1976 | Cooper et al. | |
| 4,361,202 A * | 11/1982 | Minovitch | B60K 31/0008 104/88.02 |
| 5,111,401 A | 5/1992 | Everett, Jr. et al. | |
| 5,203,923 A * | 4/1993 | Hartman | B05B 9/06 118/323 |
| 5,213,711 A * | 5/1993 | Fast | C03C 4/12 252/301.35 |
| 5,415,553 A * | 5/1995 | Szmidla | G06K 19/06018 235/494 |
| 5,622,236 A * | 4/1997 | Azumi | A47L 11/4061 180/168 |
| 5,816,886 A * | 10/1998 | Cusolito | A63H 5/00 446/444 |
| 6,163,745 A * | 12/2000 | Purchase | G05D 1/0242 318/580 |
| 8,179,337 B2 | 5/2012 | Wilzbach et al. | |
| 8,245,807 B2 | 8/2012 | Frank et al. | |
| 8,616,320 B2 * | 12/2013 | Frank | A63H 18/16 180/169 |
| 10,207,193 B2 | 2/2019 | Stenzler et al. | |

(Continued)

FOREIGN PATENT DOCUMENTS

JP   H0256610 A   2/1990

OTHER PUBLICATIONS

PCT/US2019/044595 International Search Report and Written Opinion dated Sep. 27, 2019.

*Primary Examiner* — Babar Sarwar
(74) *Attorney, Agent, or Firm* — Fletcher Yoder, P.C.

(57) ABSTRACT

A system for guiding a vehicle is provided. The system includes multiple paths on a surface, wherein each path is defined by ultraviolet (UV) reactive paint configured to emit visible light in response to UV light. The system also includes the vehicle. The vehicle includes a UV source configured to emit UV light, a sensor configured to detect the visible light emitted by the UV reactive paint of a respective path of the multiple paths, and a controller configured to guide the vehicle along the respective path based on a wavelength of the visible light detected by the sensor.

20 Claims, 3 Drawing Sheets

(56) References Cited

U.S. PATENT DOCUMENTS

| | | | |
|---|---|---|---|
| 2002/0198632 A1* | 12/2002 | Breed | B60N 2/2863 701/1 |
| 2007/0131597 A1* | 6/2007 | Chen | E02D 29/14 210/164 |
| 2010/0198514 A1* | 8/2010 | Miralles | F41G 7/008 701/302 |
| 2012/0125707 A1* | 5/2012 | Frank | A63H 18/16 180/169 |
| 2014/0129074 A1 | 5/2014 | Boshears et al. | |
| 2015/0294430 A1* | 10/2015 | Huang | G06Q 50/26 705/7.24 |
| 2015/0379704 A1* | 12/2015 | Chandrasekar | G06K 9/00664 701/25 |
| 2017/0021282 A1 | 1/2017 | Comploi | |
| 2017/0236422 A1* | 8/2017 | Naka | B60W 30/09 701/301 |
| 2018/0089901 A1* | 3/2018 | Rober | B60K 37/06 |
| 2018/0203240 A1 | 7/2018 | Jones et al. | |
| 2018/0216944 A1* | 8/2018 | Mielenz | B60W 30/0956 |
| 2019/0051153 A1* | 2/2019 | Giurgiu | G08G 1/0112 |
| 2019/0107843 A1* | 4/2019 | Dede | G05D 1/0285 |

\* cited by examiner

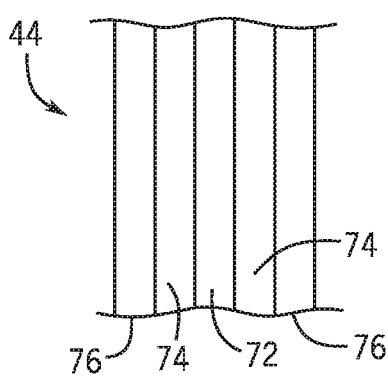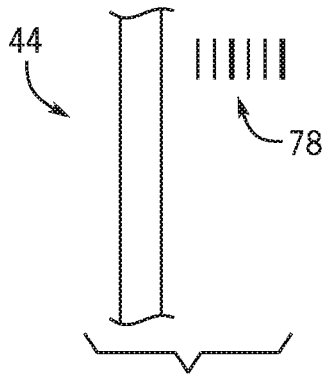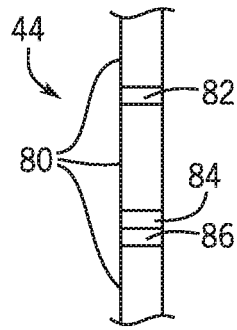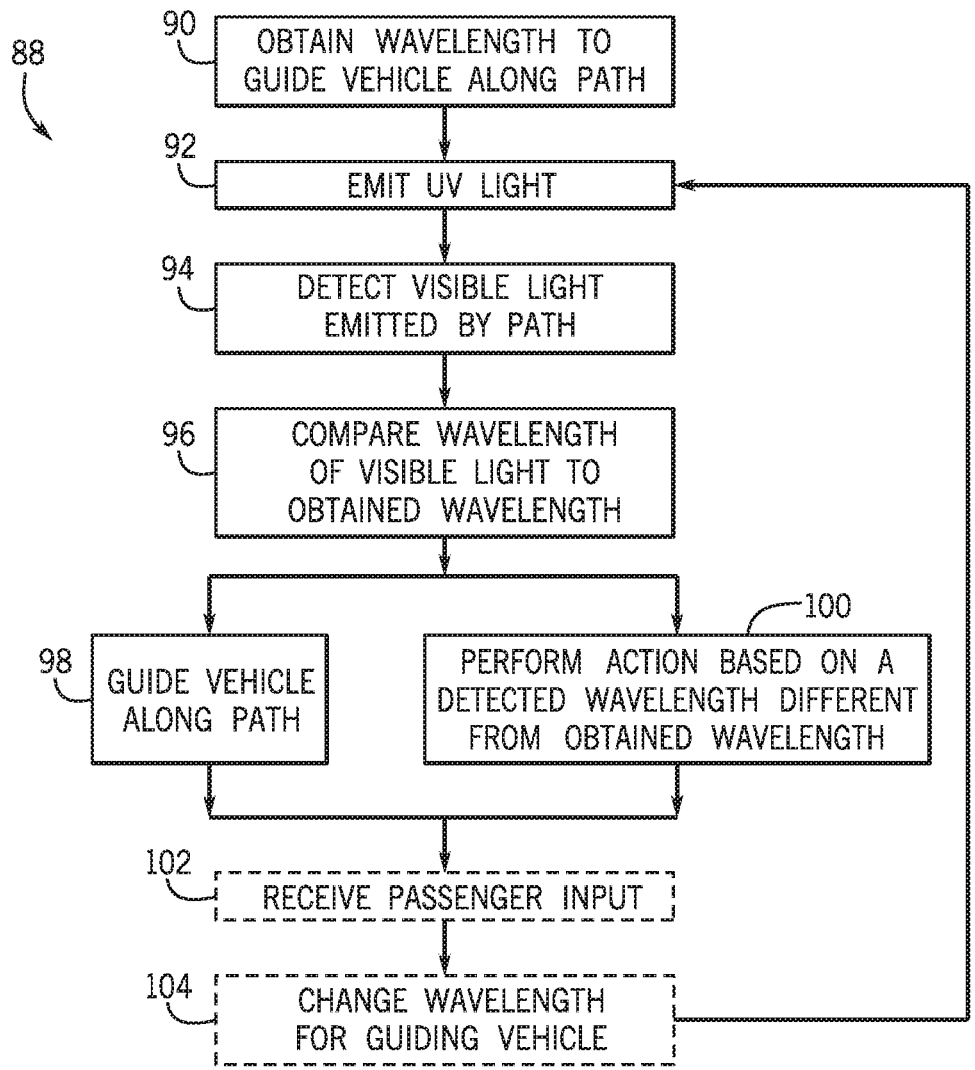

ULTRAVIOLET PAINT-BASED VEHICLE GUIDANCE

BACKGROUND

The present disclosure relates generally to the field of vehicle guidance. More specifically, embodiments of the present disclosure relate to amusement attractions utilizing ultraviolet (UV) paint-based ride vehicle guidance.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Amusement parks contain a variety of rides providing unique experiences to each park guest. The addition of large attractions, such as rides and shows, generally provides an amusement park with additional capacity to handle a larger number of guests. However, the addition of traditional rides without an added layer of intrigue may be insufficient to garner sufficient guest interest to address either guest traffic issues or provide an advantage over competitors. With the increasing sophistication and complexity of modern attractions, and the corresponding increase in expectations among amusement park and/or theme park guests, improved and more creative attractions are needed, including attractions that provide a unique guest experience.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a system for guiding a vehicle is provided. The system includes multiple paths on a surface, wherein each path is defined by ultraviolet (UV) reactive paint configured to emit visible light in response to UV light. The system also includes the vehicle. The vehicle includes a UV source configured to emit UV light, a sensor configured to detect the visible light emitted by the UV reactive paint of a respective path of the multiple paths, and a controller configured to guide the vehicle along the respective path based on a wavelength of the visible light detected by the sensor.

In another embodiment, a system for guiding a vehicle is provided. The system includes multiple paths on a surface, wherein each path of the multiple paths is defined by ultraviolet (UV) reactive paint configured to emit visible light in response to UV light. The system also includes multiple vehicles. In addition, each vehicle of the multiple vehicles includes a UV source configured to emit UV light, a sensor configured to detect the visible light emitted by the UV reactive paint of a respective path of the multiple paths, and a controller configured to guide the vehicle along the respective path of the multiple paths based on a wavelength of the visible light detected by the sensor. The UV reactive paint of each path of the multiple paths is configured to emit visible light at a different wavelength in response to the UV light than the wavelengths of visible light emitted by other paths of the multiple paths, and each vehicle is configured to move along a different path.

In another embodiment, a method for guiding a vehicle is provided. The method includes obtaining, at a controller of the vehicle, a wavelength of a visible light to guide the vehicle along a path, wherein the path is among multiple paths on a surface, and each path among the multiple paths is defined by ultraviolet (UV) reactive paint configured to emit visible light at a different wavelength in response to UV light. The method also includes emitting UV light, via a UV source on the vehicle, at the path. The method further includes detecting, via a sensor on the vehicle, the wavelength of the visible light emitted in response to the UV light. The method further includes guiding, via the controller, the vehicle along the path among the multiple paths based on the wavelength of the visible light detected by the sensor.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 4 illustrates an embodiment of a portion of a path having different UV reactive paints surrounding the path, as taken within line 4-4 of FIGS. 2 and 3, in accordance with an aspect of the present disclosure;

FIG. 5 illustrates an embodiment of a portion of a path having a symbol or marking adjacent the path, as taken within line 4-4 of FIGS. 2 and 3, in accordance with an aspect of the present disclosure;

FIG. 6 illustrates an embodiment of a portion of a path having different UV reactive paints, as taken within line 4-4 of FIGS. 2 and 3, in accordance with an aspect of the present disclosure; and FIG. 7 is a flow chart of an embodiment of a method for guiding a vehicle in an amusement attraction utilizing the UV paint-based ride vehicle guidance system of FIG. 1, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Amusement parks feature a wide variety of entertainment, such as amusement park rides, performance shows, and games. Embodiments of the present disclosure are directed to a UV paint-based ride vehicle guidance system that may be utilized at an amusement park. A plurality of paths may be disposed on a surface. Each path is defined by invisible clear UV reactive paint that emits visible light at a different wavelength (e.g., representative of different colors) in response to UV light. In certain embodiments, each path generally includes a different invisible clear UV reactive paint configured to emit visible light at a specific wavelength different from the other paths. Each ride vehicle may be equipped with a UV source configured to emit UV light and a sensor to detect emitted visible light from the UV reactive paint along the paths. The paths and the visible light emitted by the paths may not be visible to the passengers on the vehicles or the people standing by to ride the vehicles. The paths may intersect. In addition, multiple vehicles may move along the paths at the same time and pass each other. In some embodiments, the passenger may be able to change the path the vehicle is moving along via an input provided to the vehicle. In certain embodiments, the wavelengths emitted by the UV reactive paint may vary along a path at different locations to alter the speed of the vehicle (e.g., accelerate, decelerate, stop, etc.) or cause the vehicle to perform an action (e.g., spin). Due to the invisibility of the paths, the amusement attraction may seem unpredictable to the passenger and enhance the ride experience of the passenger.

Figure 1:
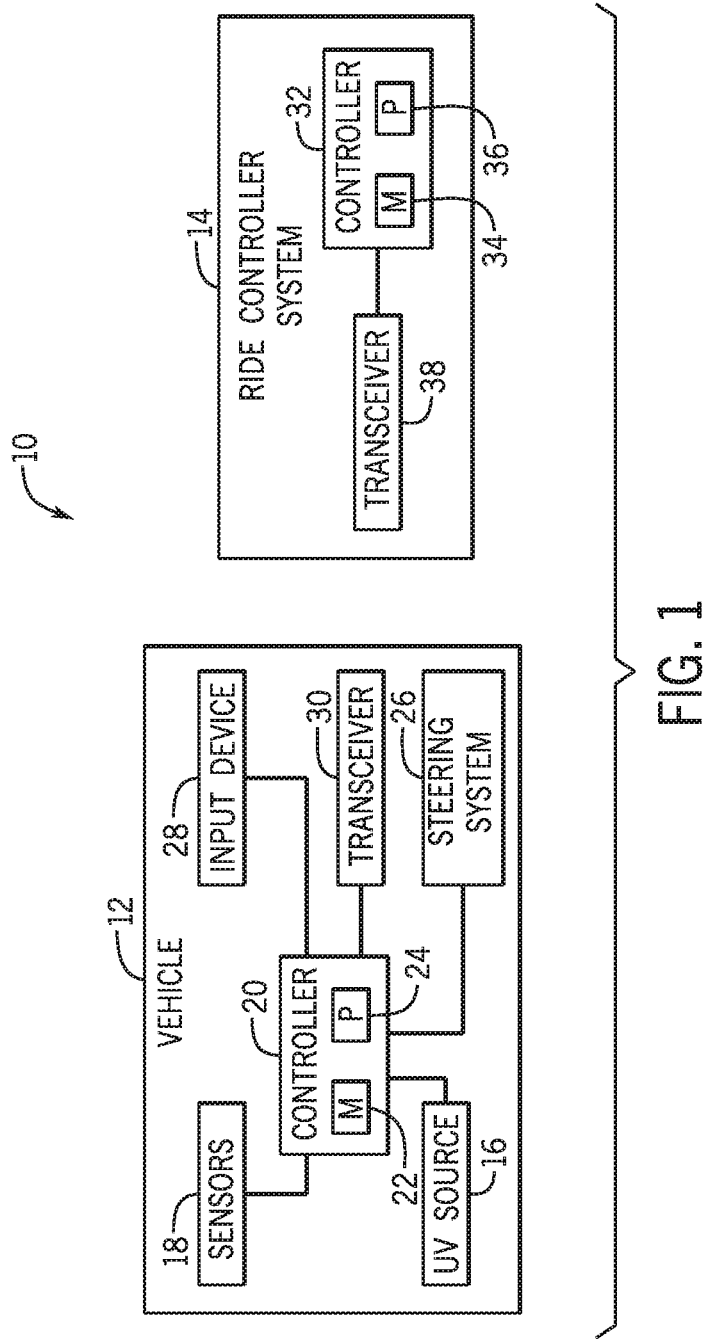
FIG. 1 is a schematic of an embodiment of a UV paint-based ride vehicle guidance system of an amusement attraction, in accordance with an aspect of the present disclosure.

Turning to the figures, FIG. 1 illustrates an embodiment of a schematic of an embodiment of a UV paint-based ride vehicle guidance system 10 of an amusement attraction. As shown in the illustrated embodiment of FIG. 1, the system 10 may include a vehicle 12 (e.g., ride vehicle) and a ride controller system 14. In certain embodiments, the system 10 may include a plurality of vehicles 12. The system 10 may be configured to be utilized in conjunction with a plurality of paths disposed on a surface. Each path may be defined by a clear invisible UV reactive paint configured to emit visible light at a specific wavelength (e.g., color) in response to UV light. In certain embodiments, each path may be defined by a different UV reactive paint configured to emit visible light at a different wavelength (e.g., yellow, pink, orange, etc.) from the UV reactive paints defining the other paths. In certain embodiments, a particular path may include, at different locations along the path, different UV reactive paints that emit different wavelengths, where different wavelengths (e.g. colors) represent different actions to be communicated to the vehicle 12. These different actions may include changing speed (e.g., accelerating, decelerating, stopping, etc.) or other actions (e.g., spin in place). In certain embodiments, a particular path may include a central portion having a UV reactive path configured to emit visible light at a first wavelength (e.g., yellow) and one or more flanking portions that emit at a different wavelength (e.g., blue, purple, red, etc.) from the first wavelength, where wavelengths emitted by the UV reactive paint in the flanking portions communicate how far the vehicle 12 is deviating from the path (e.g., the central portion) and/or that vehicle 12 correct course to get back on the path. In certain embodiments, additional marks (e.g., tick marks, bar codes, etc.) may be disposed adjacent the path in UV reactive paint to provide information (e.g., distance travelled, path information, speed, etc.) to the vehicle 12 and/or ride controller system 14. In certain embodiments, sheen leveler may be disposed over the UV reactive paint of the paths to hide the paths. Thus, in visible light, each path may not be visible to any passenger on the vehicle 12 or any person waiting to get on the ride. In addition, any visible light emitted by a respective path may not be visible to any passenger on the vehicle 12 or any person waiting to get on the ride.

The vehicle 12 may include a UV source 16 configured to emit UV light. In certain embodiments, the UV source 16 may include one or more UV light emitting diodes. The vehicle 12 also may include one or more sensors 18 configured to detect a wavelength of visible light emitted from the invisible UV reactive paint along any path. In certain embodiments, both the UV source 16 and the one or more sensors 18 may be located along the vehicle 12 (e.g., bottom portion of the vehicle 12) to keep any visible light emitted by a respective path from being seen by the passenger or any person waiting to get on the ride.

The vehicle 12 also may include a controller 20 that is configured to control the actions of the vehicle 12. The controller may include a memory 22 and a processor 24 configured to execute instructions stored on the memory 22. In certain embodiments, the memory 22 may store a wavelength (or more than one wavelength) of emitted visible light for the vehicle 12 to utilize in guiding it along a particular path. In addition, the memory 22 may store additional wavelengths of emitted visible light that cause various actions of the vehicle (e.g., accelerating, decelerating, stopping, spinning, etc.). In certain embodiments, the memory 22 may store entire paths and any wavelengths or changes in wavelengths associated with particular paths. The controller 20 may be configured to obtain a wavelength (e.g., from the memory 22 and/or the ride controller system 14) of emitted visible light to utilize in guiding the vehicle 12 along a particular path. The controller 20 also may be configured to receive the detected wavelength from the sensor 18 and to utilize it to guide the vehicle 12 along the path. In certain embodiments, a detected wavelength may cause the controller 20 to correct course back onto the path if the vehicle 12 deviates from the path.

The controller 20 may control the vehicle 12 via a steering system 26 coupled to wheels on the vehicle 12. The controller also may be coupled to an input device 12 on the vehicle 12. The input device 28 may include a touch screen, one or more buttons, levers, or any other device. The input device 28 may enable the passenger to provide an input that results in selecting and/or changing a path. For example, the input device 28 may provide the passenger different options or scenarios (e.g., passage thru a particular themed section, a difficulty level of the passage, etc.). Various inputs received via the input device 28 may be associated with particular wavelengths of emitted light to be utilized by the controller 20 in guiding the vehicle 12. In certain embodiments, the passenger may be able to provide the input prior to the ride starting, which determines the initial path and/or subsequent path utilized by the vehicle 12. In certain embodiments, the passenger may be able to provide the input during the ride to change the path of the vehicle 12 (e.g., when the vehicle 12 encounters an intersection where the current path crosses other paths). In certain embodiments, when the passenger does not provide input, the controller 20 may automatically determine the path (i.e., the wavelength to utilize) in guiding the vehicle 12.

The controller 20 also may be coupled to a transceiver 30 configured to communicate wirelessly with other vehicles that may be on the paths and/or the ride controller system 30. In certain embodiments, the vehicle 12 may communicate via the transceiver 30 its chosen wavelength, location, speed, future change in wavelength, and/or other information to the other vehicles and/or the ride controller system 14. In certain embodiments, the controller 20 may receive, via the transceiver 30, the same information about other vehicles from the vehicles and/or the ride controller system 14. In certain embodiments, the vehicle 14 may be autonomous from the ride controller system 14. In certain embodiments, control of the vehicle 14 by the controller 20 may be overridden via the ride controller system 14.

The ride controller system 14 may include a controller 32 that controls one or more of the vehicles 12 in the amusement attraction. In certain embodiments, the controller 32 may communicate a particular path (e.g., via a wavelength) for a particular vehicle 12 to utilize. In certain embodiments, the ride controller system 14 may provide an entire path and any wavelengths or changes in wavelengths associated with the particular path to the vehicle 12. In certain embodiments, the ride controller system 14 may provide information associated with other vehicles (e.g., wavelength, location, speed, future change in wavelength, and/or other information) to a particular vehicle 12. Actions for the vehicle 12 associated with particular wavelengths may be already stored on the vehicle 12 and/or provided to the vehicle 12 from the ride controller system 14. The controller 32 may be coupled to a transceiver 38 that enables wireless communication with the vehicles 12.

The processors 20, 32 may each include multiple processors, one or more "general-purpose" microprocessors, one or more special-purpose microprocessors, and/or one or more application specific integrated circuits (ASIC), or some combination thereof. For example, each processor 20 and 32 may include one or more reduced instruction set (RISC) processor, advanced RISC machine (ARM) processor, performance optimization with enhanced RISC (PowerPC) processor, field-programmable gate array (FPGA) integrated circuit, graphics processing unit (GPU), or any other suitable processing device.

Each memory device 22 and 34 may include a volatile memory, such as random access memory (RAM), nonvolatile memory, such as read-only memory (ROM), flash memory, or any combination thereof. Each memory device 22 and 34 may store a variety of information that may be used for various purposes. For example, each memory device 22 and 34 may store processor-executable instructions (e.g., firmware or software) for the respective processors 20 and 32 to execute, such as instructions for controlling the vehicle 12. The storage device(s) (e.g., nonvolatile storage) may include ROM, flash memory, a hard drive, or any other suitable optical, magnetic, or solid-state storage medium, or a combination thereof.

Figure 2:
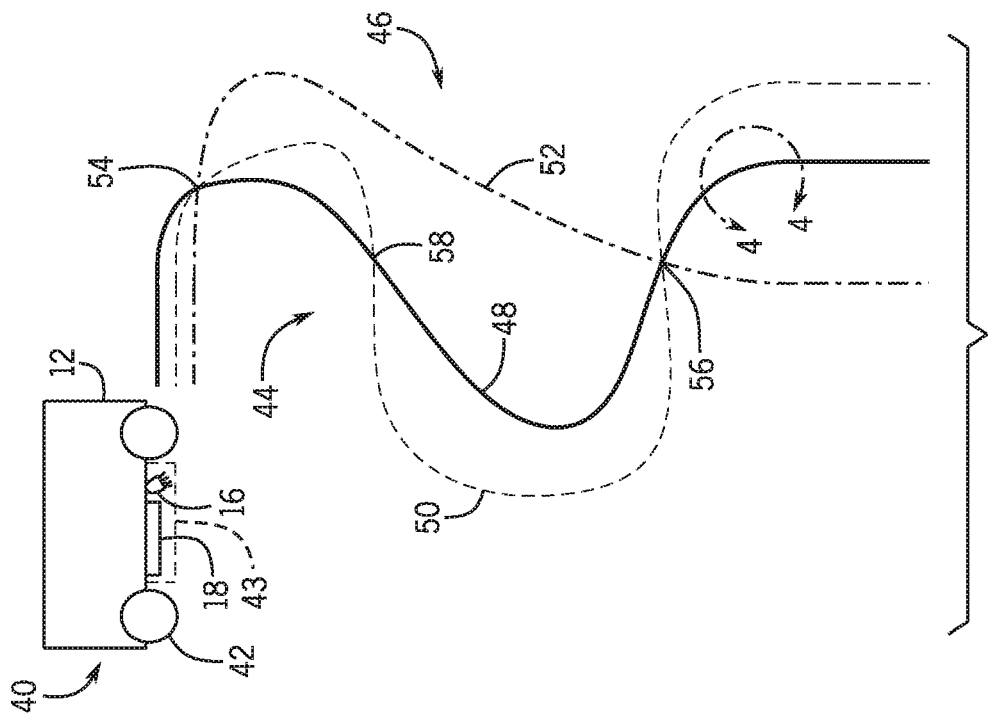
FIG. 2 illustrates an embodiment of an environment of an amusement park utilizing the UV paint-based ride vehicle guidance system of FIG. 1, in accordance with an aspect of the present disclosure.

FIG. 2 illustrates an embodiment of an environment of the amusement park utilizing the UV paint-based ride vehicle guidance system 10 of FIG. 1. The vehicle 12 depicted is as described in FIG. 1. The vehicle 12, which is configured to hold one or more passengers, may include on a bottom portion 40 of the vehicle 12 wheels 42 to enable the vehicle 12 to move along the paths 44 on surface 46. The number of wheels 42 may vary. In certain embodiments, the means for moving the vehicle may vary (e.g., tracks etc.). The wheels 42 may be coupled to the steering system described above. The vehicle 12 also may include on the bottom portion 40 the UV source 16 and the sensor 18 as described above. Locating the UV source 16 and the sensor 18 on the bottom portion 40 of the vehicle 12 may keep the visible light emitted by the paths 44 from being seen by the passenger and any person waiting to get on the ride. In certain embodiments, the location of the UV source 16 and the sensor 18 on the vehicle 12 may vary.

As depicted, a plurality of paths 44 may be disposed on the surface 46. The paths 44 may include straight and/or curved portions. Three paths 48 (solid line), 50 (dashed line), and 52 (dotted-dashed line) are illustrated. The number of paths 44 may vary. In certain embodiments, the paths 44 or portions of the paths 44 may be associated with a specific theme. In certain embodiments, the paths 44 or portions of the paths 44 may be associated with different thrill levels. For example, less thrilling paths may include a higher number of straighter portions, slower speeds, and/or gradual turns. More thrilling paths may include a higher number of curved portions, faster speeds, sharper turns, and/or spins. The paths 48, 50, 52 all three intersect at points 54 and 56. Paths 48 and 50 also intersect at point 58. Each path 44 may be primarily defined by a different clear invisible UV reactive paint that emits visible light at a specific wavelength in response to UV light. For example, the UV reactive paints defining paths 48, 50, and 52 may emit visible light in response to UV at wavelengths corresponding to yellow, pink, and green (or any other color), respectively. One benefit of utilizing UV reactive paint is that the paths 44 may be easily altered on the surface 46 with little to no facility costs. In certain embodiments, sheen leveler may be disposed over the UV reactive paint of the paths 44 to hide the paths 44. The ride may occur in the dark or in a lighted area.

At intersections 54, 56, and 58, a combination of wavelengths of visible light may be emitted. The controller of the vehicle 12 may be programmed to recognize the wavelength of the assigned path 44 and the combination of wavelengths at the intersection to keep the vehicle 12 moving along the assigned path. In certain embodiments, at the intersections 45, 56, 58, either as programmed in the controller of the vehicle 12 or based on an input received from the passenger to the controller of the vehicle 12, the vehicle 12 may change paths.

Figure 3:
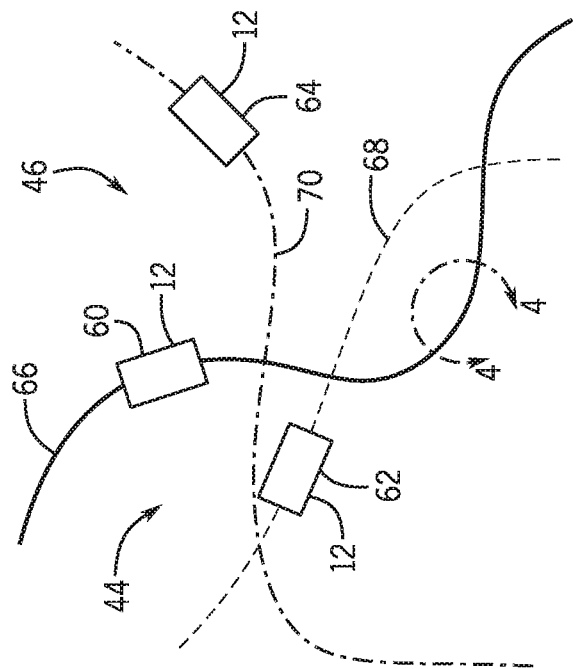
FIG. 3 illustrates an embodiment of an environment of the amusement park utilizing the UV paint-based ride vehicle guidance system of FIG. 1 (e.g., with multiple vehicles), in accordance with an aspect of the present disclosure.

As depicted in FIG. 3, multiple vehicles 12 may be moving along paths 44 on the surface 46 at the same time. The vehicle 12 and paths 44 are as described above. Three vehicles 60, 62, 64 and three paths 66, 68, 70 are illustrated. The number of vehicles 12 and paths 44 may vary. Each vehicle 60, 62, and 64 may move along their respective paths 66, 68, and 70 based on the respective wavelength of visible light emitted in response to UV light by the UV reactive paint associated with the path. The vehicles 60, 62, and 64 may be in communication with each other and/or the ride controller system. Thus, the vehicles 60, 62, and 64 and/or the ride controller system may be aware of the location of the other vehicles during the ride. In certain embodiments, the vehicles 60, 62, 64 may change paths 44 (as predetermined or in response to passenger input). In certain embodiments, a change in path due to a passenger input may be overridden (e.g., by the passenger's vehicle and/or the ride controller system) due to the location of another vehicle 12. In certain embodiments, certain selections for passenger inputs may not be presented to the passenger due to the location of other vehicles. In certain embodiments, a vehicle 12 may be sped up, slowed down, or stopped in response to the location of other vehicles. In certain embodiments, more than one vehicle 12 may travel on the same path 44.

FIG. 4 illustrates an embodiment of a portion of the path 44 having different UV reactive paints surrounding the path 44, as taken within line 4-4 of FIGS. 2 and 3. As depicted in FIG. 4, the path 44 may include a central portion 72. The central portion 72 may include the UV reactive paint that emits the visible light in response to UV light at the primary wavelength (e.g., yellow, pink, green, or any other color) for guiding the vehicle 12 along the path 44. Multiple flanking portions may flank the central portion 72. For example, a first flanking portion 74 may flank the central portion 72 and a second flanking portion 76 may flank both the central portion 72 and the first flanking portion 74. The number of flanking portions may vary. In certain embodiments, the first flanking portion 72 may have both the left and right portions defined by a UV reactive paint different (i.e., emits visible light at different wavelength) from the central portion 72, the second flanking portion 76, and any other flanking portion. The third flanking portion 76 may have both the left and right portions defined by a UV reactive paint different (i.e., emits visible light at different wavelength) from the central portion 72, the first flanking portion 76, and any other flanking portion. For example, the central portion 72 may be associated with yellow, the first flanking portion 74 with orange, and the second flanking portion 76 with red.

In certain embodiments, the wavelength emitted by the flanking portions 74, 76 may be associated within an indication of how much (e.g., distance, percentage, etc.) the vehicle 12 has strayed from the central portion 72. In certain embodiments, the wavelength emitted by the flanking portions 74, 76 may be associated with instructing the vehicle 12 to correct towards the central portion 72 (e.g., correct left, correct right, etc.). In certain embodiments, the wavelength emitted by one or more inner flanking portions may be associated with an indication of how much the vehicle 12 has strayed from the central portion 72, while the wavelength emitted by the outermost flanking portion may be associated with instructing the vehicle 12 to correct towards the central portion 72. In certain embodiments, the wavelength emitted by the outermost flanking portion may be associated with instructing the vehicle 12 to stop due to deviation from the path 44.

FIG. 5 illustrates an embodiment of a portion of the path 44 having a symbol or marking 78 adjacent the path 44, as taken within line 4-4 of FIGS. 2 and 3. As depicted in FIG. 5, symbol or marking may be painted adjacent the path 44 in the clear invisible UV reactive paint for detection by the vehicle 12. As depicted, the symbol or marking 78 may be a bar code. In certain embodiments, the symbol or marking may be a tick mark, shape, number, or any other kind of marking. The symbol or marking 78 may convey information (e.g., distance travelled, path information, speed, etc.) related to the path 44 to the vehicle 12 and/or the ride controller system.

FIG. 6 illustrates an embodiment of a portion of the path 44 having different UV reactive paints, as taken within line 4-4 of FIGS. 2 and 3. As depicted, most of the path 44 (e.g., regions 80) may be defined by the UV reactive paint that emits the visible light in response to UV light at the primary wavelength (e.g., yellow, pink, green, or any other color) for guiding the vehicle 12 along the path 44. Other regions along the path 44 may include a different UV reactive paint that emits a different wavelength from the primary wavelength associated with the path 44 that may be associated with different control actions for the vehicle 12. For example, region 80 may be yellow, while region 82 may be purple. In certain embodiments, the wavelength emitted by region 82 may cause the vehicle 12 to spin or some other action (e.g., bounce, tilt, etc.). In certain embodiments, other regions (e.g., regions 84, 86) may provide other control actions related to the vehicle 12 (e.g., accelerate, decelerate, stop, etc.). One or more regions, similar to regions 84, 86, may be spaced apart on contact each other. These regions 84, 86 may include UV reactive paints that emit different wavelengths from region 80 and each other. Each region 80, 84, 86 may be associated with a specific speed for the vehicle 12. For example, region 80 may be associated with the normal speed for the vehicle 12 along the path 44, while region 84 may be associated with a faster speed and region 86 may be associated with an even faster speed. Alternatively, region 84 may be associated with a slower speed and region 86 may be associated with an even slower speed. In certain embodiments, the change in colors emitted by the regions may have gradations. For example, regions 80, 84, 86 may be yellow, red, orange, respectively, or yellow, green, blue, respectively. The path 44 may include a combination of regions for both acceleration and deceleration of the vehicle 12. In certain embodiments, a wavelength emitted by a region may cause the vehicle 12 to have variable speeds.

FIG. 7 is a flow chart of an embodiment of a method 88 for guiding the vehicle 12 in an amusement attraction utilizing a UV paint-based ride vehicle guidance system 10 of FIG. 1. One or more of the steps of the method 88 may be performed by the vehicle's controller 20 and/or the ride controller system 14. One or more of the steps of the method 88 may be performed simultaneously and/or in a different order from that depicted. The method 88 may include obtaining a wavelength to guide the vehicle 12 along the path 44 (block 90). In certain embodiments, more than one wavelength may be obtained by the vehicle 12. For example, a first portion of a ride may follow a first path with a first wavelength and a second portion of the ride may follow a different path with a different wavelength. The wavelength may represent the color emitted by the UV reactive paint along the path 44 in response to UV light. The wavelength may be obtained from the respective memory of the vehicle's controller 20 and/or the ride controller system 14. In certain embodiments, prior to the ride beginning, the passenger may provide an input based on presented selections (e.g., related to theme, thrill level, etc.) and the input may be associated with one or more particular wavelengths associated with one or more paths 44. In certain embodiments, when multiple vehicles are going to be utilized during the ride, each vehicle 12 may obtain a respective wavelength or wavelengths to define their respective paths. In certain embodiments, with the multiple vehicles, prior to or during the ride, each vehicle 12 may obtain the wavelengths and/or other information related to the other vehicles and their respective paths.

The method 88 also may include emitting UV light via a UV source on the vehicle 12 (block 92). The method 88 further may include detecting, via a sensor on the vehicle 12, the visible light emitted by the UV reactive paint disposed along the respective path 44 for the vehicle 12 (block 94). The method 88 may include comparing the detected wavelength to the obtained wavelength associated with the vehicle's path 44 (block 96). When the detected wavelength is the same as the obtained wavelength, the method 88 may include guiding or moving the vehicle 12 along the path 44 (block 98). When the detected wavelength is different from the obtained wavelength, the method 88 may include the vehicle 12 performing a certain action while moving along the path 44 (block 100). These actions may include the vehicle 12 accelerating, decelerating, stopping, spinning, correct course back onto the path 44, or other types of actions.

In certain embodiments, the method 88 may include receiving, during the ride, input from the passenger (block 102). The passenger may provide an input based on presented selections (e.g., related to theme, thrill level, etc.) and the input may be associated with one or more particular wavelengths associated with one or more paths 44. In certain embodiments, the input may be associated with the same wavelength and the vehicle 12 keeps the same path. In certain embodiments, the passenger input may be associated with a different wavelength that changes the wavelength and, thus, the path 44 for guiding the vehicle 12 (block 104).

Although the above embodiments relate to an amusement ride, the same techniques may be utilized in other applications. For example, the techniques may be applied to toys. Multiple pens, brushes, or other items containing different clear invisible UV reactive paints that emit visible light at different wavelengths in response to UV light may create multiple paths on a surface by a user. Different toy vehicles may also be provided (e.g., equipped with UV light sources and sensors) to follow the different paths drawn on the surface with the pens or brushes by the user.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for guiding a vehicle, comprising:
a plurality of paths on a surface, wherein each path is defined by ultraviolet (UV) reactive paint configured to emit visible light in response to UV light, wherein the UV reactive paint defining each path of the plurality of paths is configured to emit visible light at a unique wavelength in response to the UV light relative to other paths of the plurality of paths;
a vehicle configured to hold a passenger, wherein the vehicle comprises:
a UV source configured to emit UV light;
a sensor configured to detect the visible light emitted by the UV reactive paint of a respective path of the plurality of paths; and
a controller configured to guide the vehicle along the respective path based on a wavelength of the visible light detected by the sensor.

2. The system for guiding a vehicle of claim 1, wherein the plurality of paths and the visible light emitted by the UV reactive paint along the plurality of paths is not visible to a passenger in the vehicle.

3. The system for guiding a vehicle of claim 1, wherein the UV reactive paint defining each path of the plurality of paths is coated in sheen leveler to hide the respective path.

4. The system for guiding a vehicle of claim 1, wherein the controller is configured to determine which path of the plurality of paths to guide the vehicle along based on an input received from the passenger, wherein the input is associated with a specific wavelength of visible light.

5. The system for guiding a vehicle of claim 4, wherein the controller is configured to receive the input during movement along the path of the plurality of paths, and to change which path of the plurality of paths to guide the vehicle along based on the input.

6. The system for guiding a vehicle of claim 1, wherein the UV reactive paint disposed along the respective path of the plurality of paths is configured to emit visible light at different wavelengths at different locations along the respective path.

7. The system for guiding a vehicle of claim 6, wherein the different wavelengths represent different speeds for the vehicle along the respective path, and the controller is configured to adjust a speed of the vehicle along the respective path based on a change in the wavelength of the emitted visible light.

8. The system for guiding a vehicle of claim 6, wherein the controller is configured to cause the vehicle to spin based on a change in the wavelength of the emitted visible light.

9. The system for guiding a vehicle of claim 1, further comprising a plurality of vehicles disposed on different paths of the plurality of paths, and respective controllers of the plurality of vehicles are configured to guide the plurality of vehicles on the plurality of paths concurrently.

10. The system for guiding a vehicle of claim 1, wherein the respective path of the plurality of paths comprises a center portion comprising a first UV reactive paint configured to emit visible light at a first wavelength and a first portion flanking the center portion comprising a second UV reactive paint configured to emit visible light at a second wavelength.

11. The system for guiding a vehicle of claim 10, wherein the controller is configured to guide the vehicle back to the center portion of the respective path of the plurality of paths in response to detection of the second wavelength.

12. A system for guiding a vehicle, comprising:
a plurality of paths on a surface, wherein each path is defined by ultraviolet (UV) reactive paint configured to emit visible light in response to UV light, wherein the UV reactive paint defining each path of the plurality of paths is configured to emit visible light at a unique wavelength in response to the UV light relative to other paths of the plurality of paths; and
a plurality of vehicles, wherein each vehicle of the plurality of vehicles is configured to hold a respective passenger and comprises:
a UV source configured to emit UV light;
a sensor configured to detect the visible light emitted by the UV reactive paint of a respective path of the plurality of paths; and
a controller configured to guide the vehicle along the respective path based on a wavelength of the visible light detected by the sensor;
wherein the UV reactive paint of each path of the plurality of paths is configured to emit visible light at a different wavelength in response to the UV light than the wavelengths of visible light emitted by other paths of the plurality of paths, and each vehicle is configured to move along a different path.

13. The system for guiding a vehicle of claim 12, wherein the plurality of vehicles is configured to move along the plurality of paths concurrently.

14. The system for guiding a vehicle of claim 12, wherein the plurality of paths and the visible light emitted by UV reactive paint along the plurality of paths is not visible to passengers in the plurality of vehicles.

15. The system for guiding a vehicle of claim 12, wherein the controller is configured to change which path of the plurality of paths to guide the vehicle along based on an input received from the respective passenger during movement along the path of the plurality of paths, wherein the input is associated with a specific wavelength of visible light.

16. The system for guiding a vehicle of claim 12, wherein the UV reactive paint disposed along the respective path of the plurality of paths is configured to emit visible light at different wavelengths at different locations along the respective path of the plurality of paths.

17. The system for guiding a vehicle of claim 16, wherein the different wavelengths represent different speeds for the vehicle along the respective path of the plurality of paths, and the controller is configured to adjust a speed of the vehicle along the respective path of the plurality of paths based on a change in wavelength of the emitted visible light.

18. A method for guiding a vehicle, comprising:
- obtaining, at a controller of a vehicle, a wavelength of a visible light to guide the vehicle along a path, wherein the path is among a plurality of paths on a surface, and each path among the plurality of paths is defined by ultraviolet (UV) reactive paint configured to emit visible light at a unique wavelength in response to UV light relative to other paths of the plurality of paths, and wherein the vehicle is configured to hold a passenger;
- emitting UV light, via a UV source on the vehicle, at the path;
- detecting, via a sensor on the vehicle, the wavelength of the visible light emitted in response to the UV light; and
- guiding, via the controller, the vehicle along the path among the plurality of paths based on the wavelength of the visible light detected by the sensor.

19. The method for guiding the vehicle of claim 18, further comprising guiding a plurality of vehicles along the plurality of paths concurrently, wherein the controllers of the plurality of vehicles guide the plurality of vehicles along different paths based on different wavelengths of detected visible light.

20. The method for guiding the vehicle of claim 18, wherein obtaining, at the controller of the vehicle, the wavelength of the visible light to guide the vehicle along the path comprises receiving an input from the passenger that selects the wavelength.

* * * * *